US010093197B2

(12) United States Patent
Deljevic et al.

(10) Patent No.: US 10,093,197 B2
(45) Date of Patent: Oct. 9, 2018

(54) KEY OFF ENERGY MANAGEMENT SYSTEM

(71) Applicant: FORD GLOBAL TECHNOLOGIES, LLC, Dearborn, MI (US)

(72) Inventors: Zeljko Deljevic, Plymouth, MI (US); James Michael Weinfurther, Farmington, MI (US); Karl William Wojcik, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/978,247

(22) Filed: Dec. 22, 2015

(65) Prior Publication Data

US 2017/0174157 A1 Jun. 22, 2017

(51) Int. Cl.
*B60R 16/03* (2006.01)
*B60L 1/00* (2006.01)
*B60L 11/18* (2006.01)

(52) U.S. Cl.
CPC .......... *B60L 11/1861* (2013.01); *B60L 1/003* (2013.01); *B60R 16/03* (2013.01); *B60L 2240/70* (2013.01); *Y02P 90/60* (2015.11); *Y02T 10/7005* (2013.01); *Y02T 10/705* (2013.01); *Y02T 10/7044* (2013.01); *Y02T 10/7291* (2013.01); *Y02T 90/16* (2013.01)

(58) Field of Classification Search
CPC .... B60L 11/1861; B60L 1/003; B60R 16/033; B60W 2540/06; G06F 1/3206; G06F 1/32; Y02B 60/34; H04L 2012/40215
See application file for complete search history.

(56) References Cited

U.S. PATENT DOCUMENTS

| | | | |
|---|---|---|---|
| 6,140,956 A | 10/2000 | Hillman et al. | |
| 8,502,495 B2 | 8/2013 | Brombach et al. | |
| 9,462,545 B2 * | 10/2016 | Kleve | H04W 52/0209 |
| 2003/0234580 A1 | 12/2003 | Gaynier et al. | |
| 2008/0246488 A1 * | 10/2008 | Bosse | G01R 19/16542 324/426 |
| 2009/0184579 A1 * | 7/2009 | Owens, Jr. | B60R 16/0236 307/10.7 |
| 2009/0224869 A1 * | 9/2009 | Baker | G07C 5/008 340/5.1 |
| 2011/0106330 A1 * | 5/2011 | Lickfelt | B60L 1/00 700/297 |
| 2011/0228429 A1 * | 9/2011 | Ueta | B60N 2/0232 361/31 |

(Continued)

FOREIGN PATENT DOCUMENTS

CN 104578319 A 4/2015

OTHER PUBLICATIONS

Search Report under Section 17(5) in corresponding international patent application No. GB 1621110.4 dated Jun. 16, 2017, 4 pages.

*Primary Examiner* — Dale S Moyer
(74) *Attorney, Agent, or Firm* — Frank MacKenzie; Brooks Kushman, P.C.

(57) ABSTRACT

A vehicle may include a body controller programmed to limit operation of at least one vehicle feature to reduce battery consumption during transit of the vehicle in response to a vehicle flag indicating a transport status, and to enable operation of the at least one vehicle feature during manufacturing in response to the vehicle flag indicating a factory status.

10 Claims, 4 Drawing Sheets

(56) References Cited

U.S. PATENT DOCUMENTS

| | | | |
|---|---|---|---|
| 2012/0109407 A1* | 5/2012 | Yousefi | H04N 7/183 |
| | | | 701/1 |
| 2012/0175972 A1 | 7/2012 | Ren | |
| 2012/0187915 A1* | 7/2012 | Brombach | B60R 16/033 |
| | | | 320/135 |
| 2013/0166144 A1* | 6/2013 | Lickfelt | B60R 25/406 |
| | | | 701/36 |
| 2013/0249279 A1* | 9/2013 | Sogabe | B60R 16/03 |
| | | | 307/9.1 |
| 2014/0274223 A1* | 9/2014 | Kleve | H04W 52/0209 |
| | | | 455/574 |
| 2015/0094937 A1* | 4/2015 | Holub | F02D 28/00 |
| | | | 701/112 |
| 2015/0197160 A1* | 7/2015 | Buecherl | B60L 11/1851 |
| | | | 701/22 |
| 2015/0355703 A1* | 12/2015 | Macdonald | G06F 1/3246 |
| | | | 701/36 |
| 2016/0311384 A1* | 10/2016 | Acuna | B60R 16/03 |
| 2016/0311385 A1* | 10/2016 | Wojcik | B60R 16/03 |

* cited by examiner

KEY OFF ENERGY MANAGEMENT SYSTEM

TECHNICAL FIELD

Disclosed herein are key off energy management systems.

BACKGROUND

As more and more features are added to various vehicles, more electrical modules are needed. With this increase in electrical modules comes an increase in power requirements, both during vehicle use and non-use. When the vehicle ignition is off, power is supplied to the various modules by the vehicle battery. Thus, the amount of load placed on the battery during vehicle key off is increasing. This may lead to the use of heavier, larger, and more expensive batteries.

SUMMARY

A vehicle may include a body controller programmed to limit operation of at least one vehicle feature to reduce battery consumption during transit of the vehicle in response to a vehicle flag indicating a transport status, and to enable operation of the at least one vehicle feature during manufacturing in response to the vehicle flag indicating a factory status.

A vehicle may include a body controller programmed to receive a life cycle indicator and at least one other factor and to limit or enable at least one vehicle feature based the life cycle indicator and at least one other factor, the at least one other factor including at least one of a time since vehicle key-off and a battery status.

A vehicle may include a body controller programmed to limit operation of at least one vehicle feature in response to a vehicle flag indicating a manufacture status and to enable the at least one vehicle feature in response to the vehicle flag indicating a consumer status.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Described herein an energy consumption management system for managing the key off load (KOL) to a battery. To limit the battery drain during vehicle key-off, various key off operating modes may be developed. These modes may permit necessary vehicle features to be available, while disabling, or slowing down other vehicle features. In one example, during a transportation mode where a vehicle is being transported from an assembly location to a dealership, features may be disabled aggressively since little-to-no customer interaction is to occur during this time. In this mode, specific features such as power lift gates, power running boards, etc., may be disabled.

Figure 1A:
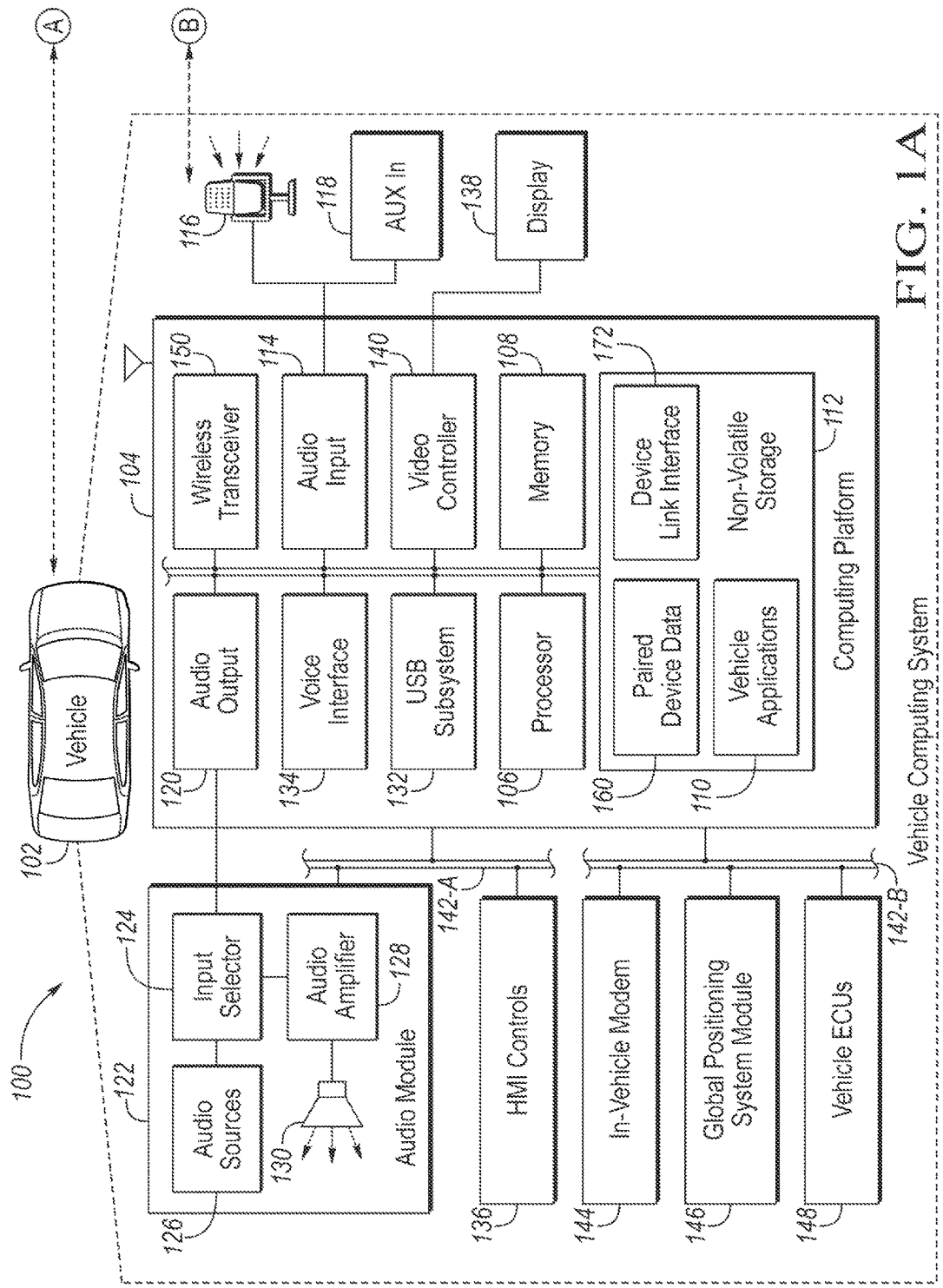
FIGS. 1A and 1B illustrate an example diagram of a system that may be used to provide telematics services to a vehicle.
Figure 1B:
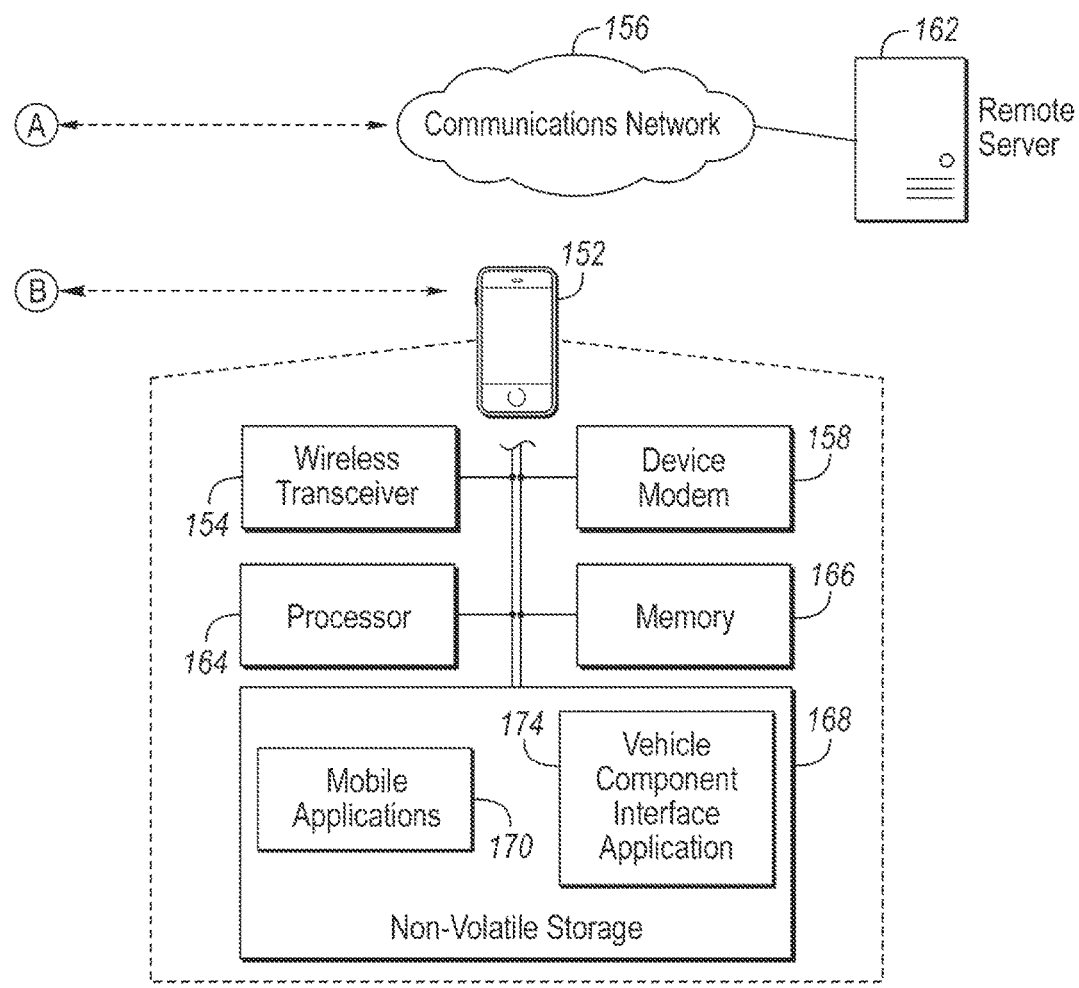

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 and controllers configured to perform instructions, commands and other routines in support of the processes described herein. For instance, the computing platform 104 may be configured to execute instructions of vehicle applications 110 to provide features such as navigation, accident reporting, satellite radio decoding, hands-free calling and parking assistance. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Assembly, Fortran, Pascal, Java Script, Python, Perl, and PL/SQL, or other programming language.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module (as shown as BCM 210 in FIG. 2) configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be once such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case such the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features.

Systems such as the system 100 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 to have been paired with or be in communication with the computing platform 104.

The vehicle ECUs 148 may include various sleep ECUs (as shown as ECUs 212 and 224 in FIG. 2) configured to operate in various vehicle modes where the respective ECU is configured to use significantly less current, as well as monitor inputs in order to determine whether the ECU should wake-up. During the sleep ECU power consumption mode, most, if not all, vehicle features are inactive. As described herein, a key off load (KOL) mode may modify the ECU sleep modes to reduce KOL.

Figure 2:
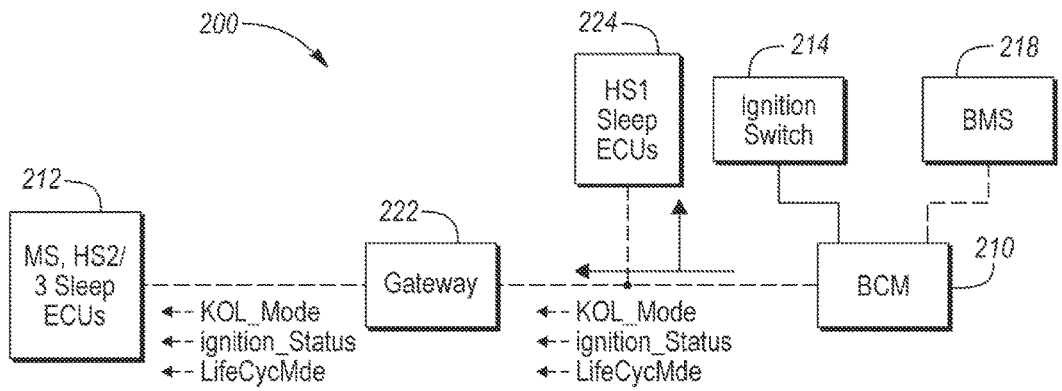
FIG. 2 illustrates an example block diagram of a portion of an energy management system.

FIG. 2 illustrates a block diagram of an energy management system 200 configured to manage energy modules and vehicle features based on a vehicle mode. The system 200 may include various sleep ECUs 212, 224 as described above. The sleep ECUs 212, 224 may be configured to perform in various power consumption modes, such as the ECU sleep mode.

The system 200 may include a body control module BCM 210 configured to interface with an ignition switch 214 and the BMS 218. The BCM 210 may maintain various life cycle modes of the vehicle. The BCM 210 may receive the current life cycle mode from a technician, service provider, engineer, or similar personnel during manufacturing. The life cycle mode may be updated based on the location or status of the vehicle. For example, during assembly and testing at a manufacturing plant, the life cycle mode may be in a 'factory' mode. After manufacturing is complete, and the vehicle is being transported to a dealership, the life cycle mode may be in a 'transport mode'. Furthermore, once the vehicle reaches the dealership, appropriate personnel may update the life cycle status to a 'normal' mode.

Once the vehicle enters a 'normal' mode, the BCM 210 may update a key off load (KOL) mode based on the life cycle mode and certain other factors. The BCM 210 may select the KOL mode when the initiation status is OFF. That is, the KOL mode may only be selected in response to vehicle key-off. As explained, the modes may be selected based on the vehicle location or vehicle status (e.g., the vehicle is at the factory, or the vehicle is in transport). Other factors may include a time since the ignition has been turned off and the state of charge (SOC) of the vehicle battery. In one example, the BCM 210 may update the KOL mode to a 'critical' mode in response to a low SOC being detected. In another example, the BCM 210 may update the KOL mode in response to the vehicle being turned off for a predefined amount of time (e.g., five days). The various KOL modes are described in more detail herein.

The ignition switch 214 may be configured to receive input from the user as to start or stop the vehicle. The ignition switch 214 may be a traditional key-in switch configured to receive a physical key and upon rotation, start the vehicle engine. The ignition switch 214 may also be a keyless start switch configured to be depressed to start the vehicle. The ignition switch 214 may recognize several settings or positions such as START to start a vehicle, OFF when the vehicle is off, and ACC when the vehicle is in accessory (e.g., allowing certain vehicle features such as the radio, power windows, etc., to be operated).

A battery management system (BMS) 218 may be a controller, processor and memory configured to manage the electric vehicle battery (not shown). The BMS may supply various battery data to the BCM 210 such as a battery critical signal, or other battery data such as the battery state of charge (SOC).

The system 200 may include a gateway 222 arranged between the sleep ECUs 212 and the BCM 210. The gateway may be a smart diagnostic link connector (SDLC) gateway configured to transmit a KOL mode, among other data and commands to the sleep ECU 212. Further, the system 200 may include other sleep ECUs 224 also configured to receive signals and commands from the BCM 210. The sleep ECUs 224 may be arranged on the same bus as a commanding ECU, such as the BCM 210, and the ECUs 212 may be arranged on another communication bus. Both may receive a mode command via the gateway 222. FIG. 2 is an example system and the gateway and additional ECUs 224 may be replaced by a single HS-CAN network.

Figure 3:
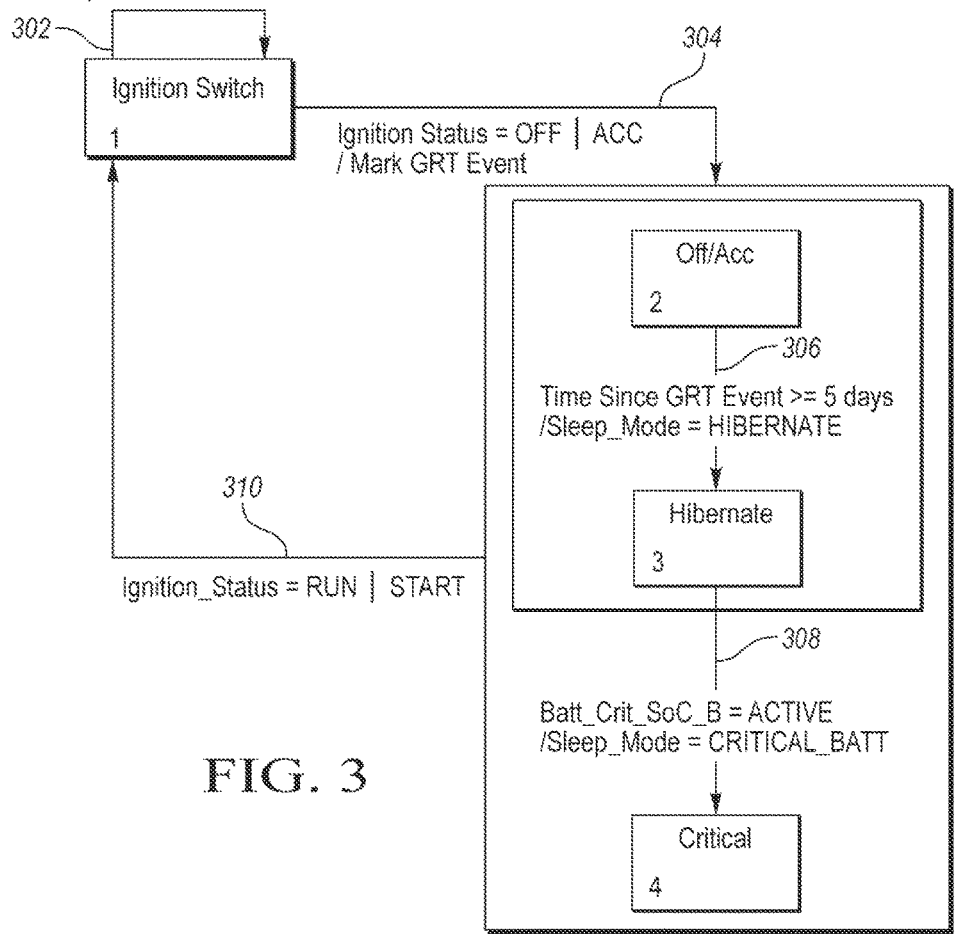
FIG. 3 illustrate an example state flow diagram and process flow for the energy management system.

FIG. 3 is an example process flow diagram illustrating an example state flow for the system 200 of FIG. 2. The BCM 210 may manage various modes in addition to the life cycle mode. These modes may include a vehicle mode, a sleep mode, and a KOL mode. Table 1 below shows the various modes.

TABLE 1

KOL Modes

| Ignition Status | Life Cycle Mode | Sleep Mode | KOL Mode |
|---|---|---|---|
| RUN\|START\|ACC | Don't care | Don't care | NORMAL |
| OFF | FACTORY | Don't care | FACTORY |
| OFF | TRANSPORT | Don't care | TRANSPORT |
| OFF | NORMAL | NORMAL | NORMAL |
| OFF | NORMAL | HIBERNATE | HIBERNATE |
| OFF | NORMAL | CRITICAL | CRITICAL |

As explained, the life cycle mode may be an indication of the current vehicle location and/or status. The sleep mode may be an indication of the status of the sleep ECUs. For example, the sleep mode may indicate how the sleep ECUs are to behave in various life cycle modes. The KOL mode may be the operating/vehicle mode during key off, as determined by the BCM 210 based on the vehicle/life cycle mode and various other factors. The BCM 210 may update or alter these modes based on certain vehicle events such as a change in the ignition status.

FIG. 3 illustrates an example process flow for updating certain modes. At step 302, the ignition switch 214 may be turned on and may transmit an ignition status of START or RUN to the BCM 210. Further, the sleep mode may be in normal mode. At step 304, the ignition switch 214 may be turned off and may transmit an ignition status to OFF to the BCM 210. At step 306, the BCM 210 may then determine how long the ignition status has been OFF. If the ignition status has been OFF for longer than a predefined amount of time (e.g., 5 days), then the BCM 210 may update the sleep mode to hibernate. The BCM 210 may also update the KOL mode to hibernate.

At step 308, the BCM 210 may determine if the battery SOC is below a predefined threshold. This may be realized in response to the BCM 210 receiving a battery critical signal from the BMS 218 or other control modules. The BCM 210 may update the sleep mode to be critical in response to receiving the battery critical signal.

At step 310, if the ignition status changes to RUN or START, the BCM 210 may update the KOL to normal mode. The BCM 210 may then continue to wait for an ignition status of OFF.

Table 2 illustrates an example table illustrating the relationships between the ignition status, the life cycle mode and the KOL modes.

TABLE 2

KOL Mode with respect to Life Cycle Mode and Ignition Status

| Ignition Status | Life Cycle Mode | KOL Mode | Comment |
|---|---|---|---|
| RUN\|START\|ACC | Don't care | NORMAL | more battery power can be used |
| OFF | FACTORY | FACTORY | many features need to operate so VO can verify performance |
| OFF | TRANSPORT | TRANSPORT | very strict limitations to meet transport requirements (for example 100 days) |
| Has just been turned OFF | NORMAL | NORMAL | Normal feature usage expected - more battery drain allowed |
| Ignition has been OFF for 5 days | NORMAL | HIBERNATE | After 5 days of Key OFF, features begin to shut down to save battery |
| Ignition is OFF and battery state of charge is too low. | NORMAL | CRITICAL_BATT | Need to conserve as much power as possible in order to allow the customer to start the car later. |

As shown in Table 2, The KOL mode is normal when the ignition status is in RUN, START, or ACC. This is due to the fact that these ignition modes require full function. Limiting features in these ignition modes may not be not desirable. When the ignition status is OFF (i.e., the vehicle is keyed off), the KOL mode may be in one of a normal, transport, or factory mode. The BCM 210 may select one of these modes based on the life cycle mode, as well as other factors such as SOC and time since the ignition has been turned off.

During normal life cycle modes, the KOL mode may be one of normal, hibernate, or critical. If the ignition has recently been turned off, the KOL mode may be in the normal mode. In this mode, normal feature usage may be realized and more load or battery drain is permitted. If the ignition has been off for a predefined amount of time, such as longer than five days, the KOL mode may be hibernating. In this mode, certain features are shut down to conserve battery power. This may be the case when a vehicle is parked for a long time and it may be beneficial to conserve battery power so that the vehicle may eventually be started again.

During the normal life cycle mode, the KOL may be critical when the BCM 210 receives indications that the battery SOC is below a certain threshold. This indication may be received in the form of a SOC value received from the BMS 218. In this example, the BCM 210 may determine whether the SOC is below a predefined threshold. That is, if the SOC is below 10%, for example, then the BCM 210 may determine that the battery is critical, and trigger the critical KOL mode. In another example the BMS 218 may transmit a battery critical signal to which the BCM 210 may select the critical KOL mode. In this mode, as much battery power should be conserved as possible to allow the customer to start the car. This mode may be entered whenever the SOC is below a certain threshold, regardless of when the ignition has been turned off.

When the life cycle mode is factory mode, the KOL mode may also be factory mode. In this mode, many features should be enabled in order to perform testing and to verify performance during vehicle assembly. When the life cycle mode is transport mode, the KOL mode may also be transport mode. In this mode, many features may be limited, slowed, or disabled to conserve the battery during the transport of the vehicle from the factory to the dealership.

Table 3 below illustrates example feature permissions in the various KOL modes.

TABLE 3

KOL Mode and Feature Summary

| FACTORY | TRANSPORT | NORMAL | HIBERNATE | CRITICAL_BATT | KOL Mode / ECU Sleep, Reduced KOL Requirement |
|---|---|---|---|---|---|
| *Low-Level Fundamentals* | | | | | |
|  | ✓ |  | ✓ | ✓ | Slow input sampling of critical inputs only |
| ✓ | ✓ | ✓ | ✓ | ✓ | Reduced Pull-up settling time |
| ✓ | ✓ |  |  | ✓ | No RealTime Clock Recalibration |
| *Battery Savers & Delayed Accessory* | | | | | |
| ✓ | ✓ |  |  | ✓ | Courtesy/DemandLamp BattSaver duration reduced to one minute |
| ✓ | ✓ |  | ✓ | ✓ | HeadLamp BattSaver duration reduced to one minute |
| ✓ | ✓ |  |  | ✓ | Delayed Accessory duration reduced to one minute |
|  | ✓ |  | ✓ | ✓ | PowerPoint Latched Relays forced OFF |
| *Feature Behavior Restrictions* | | | | | |
| ✓ | ✓ | ‖ | ‖ | ‖ | Disable Perimeter Alarm & Battery Backed Sounder "heartbeat" |
| = | ✓ | ☐ | ☐ | ✓ | RKE RF Monitoring uses Reduced Current Drain Strategy |
| ✓ | ✓ |  | ✓ | ✓ | Approach Detection Disabled |
| All | None | All | All | Driver | Allowed Passive Entry Doors w/ Cap Sensors |
| = | Disabled |  Reduced | Disabled |  | TPM RF Monitoring uses Reduced Current Drain Strategies |
| ✓ | ✓ | ‖ |  | ✓ | Disable Welcome/Farewell |
| = | = |  |  | ✓ | Disable ParkLamp Detent on the Headlamps Switch |
|  | FastSleep |  | LimitWake | LimitWake | TCU uses Reduced Current Drain Strategies |
| ✓ | ✓ |  | ✓ | ✓ | Disable Fuel-Operated Heater |
| ✓ | ✓ |  |  | ✓ | Disable Infotainment Extended Play |
|  |  |  | ✓ | ✓ | Electro-Chromic Device Dimming uses Reduced Current Drain Strategy |
| ✓ | ✓ |  |  |  | Disable Air-Suspension System After-Run Mode |

As shown in Table 3, various ECU sleep and KOL requirements are listed. These requirements may describe various vehicle features affected in response to the system 200 attempting to limit the KOL. Table 3 illustrates an example configuration of the various features and requirements that may be affected during certain KOL modes. For example slow input sampling of critical inputs may be enabled when the KOL mode is in transport, hibernate, or critical modes. This requirement may aim to reduce the number of inputs that may wake and ECU. For example, in a normal operating mode, all polled inputs may be process normally, e.g., every 50 ms. In the hibernate mode, input polling may be disabled for all non-critical inputs. At the same time, critical inputs may be polled at a slower polling rate of 150 ms or greater, for example. Furthermore, in the transport mode, input polling may be process at an even slower rate, such as 500 ms or greater, for example.

In another example, the operation of real time clock recalibration may differ depending on the KOL mode. The real-time clock recalibration may be used to periodically calibrate a low-current microprocessors internal RC oscillator. During factory, transport, and critical modes, the real-time clock recalibration is disabled.

Is also illustrated in Table 3, battery and delayed accessory features may also operate depending on the KOL mode. With respect to the courtesy lamp, a timer may be started on any ignition transition to OFF. Whenever the KOL mode is in one of the factory, transport, or critical modes, the courtesy lamp may not remain on for more than 60 seconds, for example. Similarly, the delayed accessory may not be available for more than 60 seconds.

Furthermore, a headlamp may not remain on for more than 60 seconds, for example, during factory, transport, hibernate, and critical modes. During the transport, hibernate, in critical modes, and PowerPoint latched relays may also be forced off.

Various vehicle features including features associated with the vehicle alarm, keyless entry, infotainment systems, etc. may also be affected based on the KOL mode. In one example, a vehicle's perimeter alarm may be disabled when the KOL mode is either in factory or transport mode. In another example, RKE RF monitoring may be disabled during the transport mode. Similar monitoring may be reduced during the critical mode.

During the factory, transport, hibernate, and critical modes, approach detection may be disabled to reduce drain on the battery. In this example, low-frequency (LF) antenna pulses may be disabled as well as radio frequency (RF) receivers.

Passive entry may also be limited during the transport and critical modes. In one example, during the transport mode, passive entry may be completely disabled. Additionally or alternatively, during the critical mode, passive entry may be disabled with respect to each of the passenger doors while functionality may be maintained for the driver door.

Other features such as tire pressure monitoring (TPM) may also be managed based on the KOL mode. During transport and critical modes, TPM may be disabled. During normal and hibernate modes, TPM may realize a reduced current drain strategy, including a slower pole rate, reduce polling periods, or no polling at all.

During factory, transport and critical modes, welcome and farewell requirements may be adjusted. In this example the welcome and farewell requirements may be disabled, and/or may not remain on for more than 60 seconds, for example. In one example, this may include disabling park lamps and puddle lamps in response to detecting an approaching driver. In another example, map lights, backlighting, and other features that are typically turned on when a driver is approaching or leaving a vehicle, may be disabled. During the critical battery mode, a park lamp switch may be disabled in an effort to conserve battery power.

The BCM 210 may also provide instructions to the TCU to reduce current drain during key off. These include a fast sleep feature and a limit wake feature. During the fast sleep feature, the TCU shall enter a deep sleep quickly after CAN sleep. During the limit wake feature, the TCU may only wake the CAN bus to issue requests such as vehicle unlock requests. Thus, the TCU shall not wake up the CAN bus unless necessary.

During the transport mode, the BCM 210 may instruct the TCU to use the fast asleep feature. During the hibernate mode, the BCM 210 may instruct the TCU to use both the fast sleep and limit wake features.

In a further effort to limit current drain during key off, the fuel-operated heater (FOH) for the vehicle may be disabled during the factory, transport, hibernate, and critical modes. Infotainment may also be limited during factory, transport, and critical modes.

The functionality of other electrical elements of the vehicle, such as electronic mirrors, sunroofs, windows, etc., may be limited during transport and critical modes. These elements may be completely disabled, or have reduced performance levels. In another example, air suspension monitoring may be disabled during the factory and transport modes.

Figure 4:
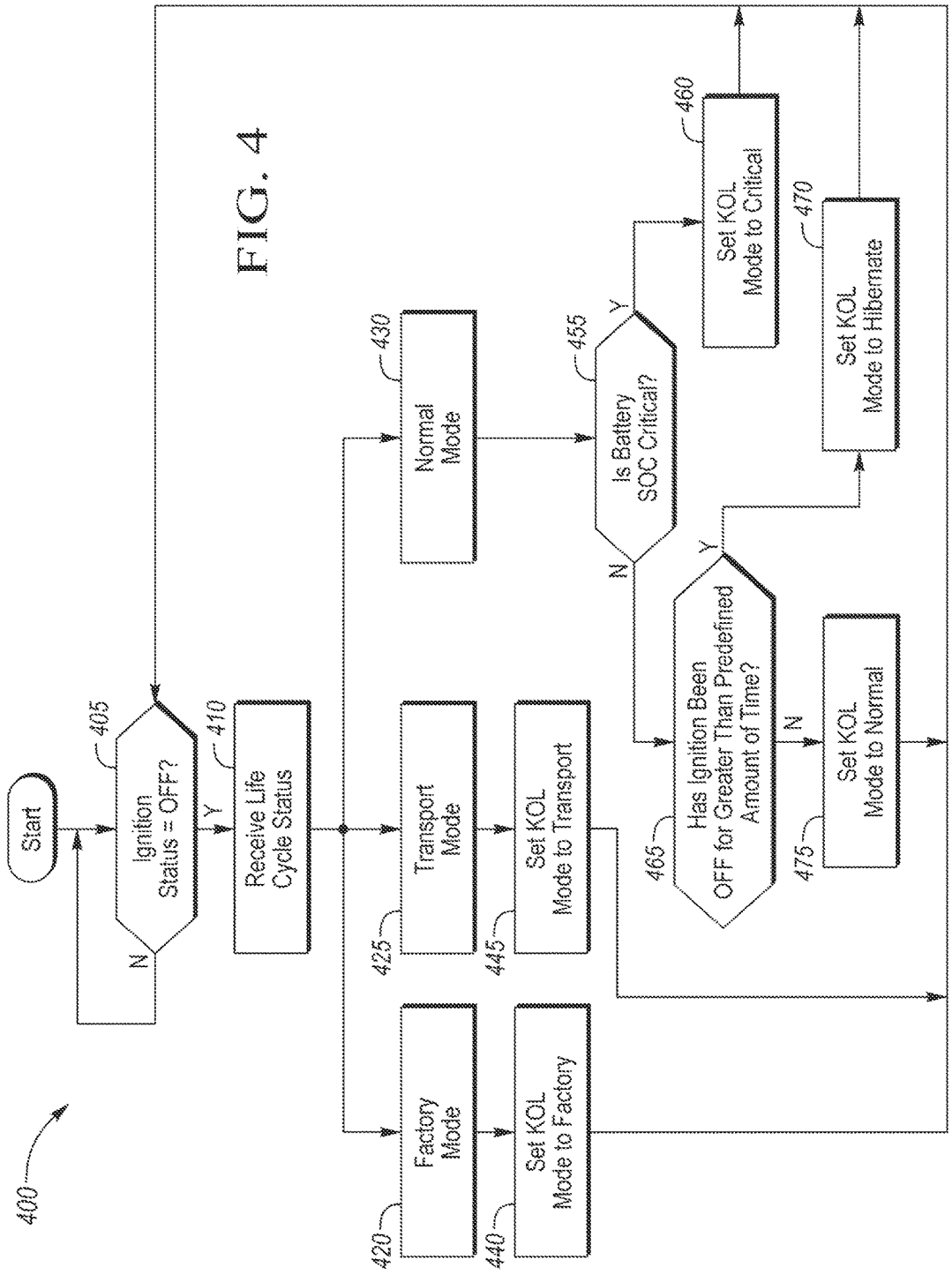
FIG. 4 illustrates an example flow chart for a process of the energy management system.

FIG. 4 is an example flow chart for an example process 400 for the system 200. The process 400 may start at block 405 where the BCM 210 may determine if the ignition status is OFF. If the ignition status is OFF, the process 400 proceeds to block 410.

At block 410, the BCM 210 may receive the life cycle mode. As explained, this mode may be received and updated within the BCM 210 based on technician input or updates. The life cycle mode may be one of factory mode, transport mode, or normal mode. If the life cycle mode is in factory mode, the process 400 may proceed to block 420. If the life cycle mode is in transport mode, the process 400 may proceed to block 425. If the life cycle mode is in normal mode, the process 400 may proceed to block 430.

At block 440, once the BCM 210 recognizes the life cycle mode to be in factory mode, the BCM 210 may determine that KOL mode is also to be in factory mode. As explained, factory mode enables most features for verification and testing, but may slow the response time of some of the features so as to reduce battery drain during manufacturing.

At block 445, once the BCM 210 recognizes the life cycle mode to be in transport mode, the BCM 210 may determine that KOL mode is also to be in transport mode. As explained, transport mode disables most features, or significantly limits features, so as to reduce as much battery drain during transport of the vehicle from the factory to the dealership.

At block 430, once the BCM 210 recognizes the life cycle mode to be in normal mode, the process may proceed to block 455 where the BCM 210 may determine whether the battery SOC is critical. This may be done by receiving a SOC and determining whether the SOC is below a predefined threshold. This may also be determined in response to receiving a battery critical signal from the battery or battery controller. If the BCM 210 determines that the SOC is below the threshold, the process 400 proceeds to block 460 where the BCM 210 may determine that the KOL mode is to be in critical mode. If not, the process 400 proceeds to block 465.

At block 465, the BCM 210 may determine if the ignition status has been OFF for greater than a predefined amount of time such as five days. If the BCM 210 determines that the vehicle has been off for more than the predefined amount of time, the process 400 proceeds to block 470 where the BCM 210 may determine that the KOL mode is to be in hibernate mode. If not, the process 400 proceeds back to block 475 and the KOL mode remains in normal mode.

The BCM 210 may continue to evaluate and update the KOL mode until the ignition status changes to RUN, START, or ACC.

Accordingly, a key off energy consumption system is disclosed herein. The system is configured to control the various sleep ECUs in an efficient and consistent manner based on the ignition status, the life cycle mode, and/or various other factors such as SOC and time since ignition off. Moreover, the system provides for flexible and reconfigurable customizations based on the vehicle, make, model, user or dealer preferences, etc. By slowing or disabling various vehicle features based on the life cycle modes, the key off load is decreased, thus conserving battery charge and battery life span.

Computing devices, such as the computing platform, processors, controllers, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included with in a computing device employing a computer operating system such as one of those mentioned above, and are accessed via a network and any one or more of a variety of manners. A file system may be accessible for a computer operating system, and make the files stored in various formats. An RDBMS generally employs the Structure Query Language (SQL) in addition to language for creating, storing, editing, and executing stored procedures, such as PL/SQL language mentioned above.

In some examples, system elements may be implemented as computer-readable instructions (e.g., software) on one or more computing devices (e.g., servers, personal computers, etc.) stored on computer readable media associated there with (e.g., disks, memories, etc.). A computer program product may comprise such instructions stored in computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a body controller programmed to limit operation of at least one vehicle feature to reduce battery consumption during transit of the vehicle in response to a vehicle flag indicating a transport status, and to enable operation of the at least one vehicle feature during manufacturing in response to the vehicle flag indicating a factory status, wherein limiting operation of the feature includes slowing response sampling associated with the feature.

2. The vehicle of claim 1, wherein the body controller is further programmed to receive an ignition status, and to limit or enable the operation of the at least one vehicle feature in response to receiving an off ignition status.

3. The vehicle of claim 1, wherein limiting operation of the at least one vehicle feature includes disabling the at least one vehicle feature.

4. A vehicle comprising:
   a body controller programmed to receive a life cycle indicator and at least one other factor and to limit or enable at least one vehicle feature based on the life cycle indicator and at least one other factor, the at least one other factor including at least one of a time since vehicle key-off and a battery status, wherein limiting the at least one vehicle feature includes slowing response sampling associated with the at least one feature.

5. The vehicle of claim 4, wherein limiting the at least one vehicle feature includes disabling the at least one vehicle feature to reduce battery load.

6. The vehicle of claim 4, wherein the at least one vehicle feature includes at least one of a delayed accessory, approach detection, passive entry and tire pressure monitoring.

7. A vehicle comprising:
   a body controller programmed to limit operation of at least one vehicle feature in response to a vehicle flag indicating a manufacture status and to enable the at least one vehicle feature in response to the vehicle flag indicating a consumer status, wherein limiting operation of the at least one vehicle feature includes slowing response sampling associated with the at least one feature.

8. The vehicle of claim 7, wherein the body controller is further programmed to receive an ignition status, and to limit or enable the at least one vehicle feature in response to receiving an off ignition status.

9. The vehicle of claim 7, wherein limiting operation of the at least one vehicle feature includes disabling the at least one vehicle feature.

10. The vehicle of claim 7, wherein the manufacture status indicates that the vehicle is one of in transit or in production.

* * * * *